United States Patent
Baviloliaie et al.

(10) Patent No.: US 12,247,542 B2
(45) Date of Patent: Mar. 11, 2025

(54) OPTIMIZED SPAR CAP STRUCTURE FOR WIND TURBINE BLADE

(71) Applicants: LM WIND POWER A/S, Kolding (DK); BLADE DYNAMICS LIMITED, Eastleigh (GB); BLADE DYNAMICS LLLP, New Orleans, LA (US)

(72) Inventors: Mahdi Baviloliaie, Kolding (DK); Jeppe Jørgensen, Kolding (DK); Michael Koefoed, Kolding (DK); Jens Zangenberg Hansen, Kolding (DK); Thomas Merzhaeuser, Salzbergen (DE); Rama Razeghi, Eastleigh (GB); Amir Riahi, New Orleans, LA (US); Andrew M. Rodwell, New Orleans, LA (US)

(73) Assignees: LM WIND POWER A/S, Kolding (DK); BLADE DYNAMICS LIMITED, Eastleigh (GB); BLADE DYNAMICS LLLP, New Orleans, LA (US)

(*) Notice: Subject to any disclaimer, the term of this patent is extended or adjusted under 35 U.S.C. 154(b) by 68 days.

(21) Appl. No.: 17/911,855

(22) PCT Filed: Apr. 28, 2021

(86) PCT No.: PCT/EP2021/061185
§ 371 (c)(1),
(2) Date: Sep. 15, 2022

(87) PCT Pub. No.: WO2021/219751
PCT Pub. Date: Nov. 4, 2021

(65) Prior Publication Data
US 2023/0141573 A1     May 11, 2023

(30) Foreign Application Priority Data

Apr. 28, 2020 (WO) .................. PCT/EP2020/061761
Jul. 24, 2020 (GB) ...................................... 2011476
Jul. 24, 2020 (GB) ...................................... 2011495

(51) Int. Cl.
*F03D 1/06* (2006.01)
*B29C 70/00* (2006.01)
(Continued)

(52) U.S. Cl.
CPC ............ *F03D 1/0675* (2013.01); *B32B 27/08* (2013.01); *B32B 27/20* (2013.01); *B32B 2250/02* (2013.01);
(Continued)

(58) Field of Classification Search
CPC ...... F03D 1/0675; F03D 1/065; F03D 1/0641; F03D 3/062; F03D 1/0681; F03D 1/0677;
(Continued)

(56) References Cited

U.S. PATENT DOCUMENTS 5,100,713 A      3/1992 Homma et al.
9,816,482 B2 *  11/2017 Caruso .................. F03D 1/0675
(Continued)

FOREIGN PATENT DOCUMENTS

DE      102014104266 A1     10/2015
DE      102016009640 A1     2/2018
(Continued)

*Primary Examiner* — Eric J Zamora Alvarez
(74) *Attorney, Agent, or Firm* — Nath, Goldberg & Meyer; Jerald L. Meyer; Tanya E. Harkins

(57) ABSTRACT

The present disclosure relates to a spar cap (10) for a wind turbine blade (1000) comprising: a plurality of spar cap layers (20) and a first interlayer (30) arranged between the first spar cap layer (20*a*) and the second spar cap layer (20*b*) and comprising: a number of first interlayer areas (31),
(Continued)

Figure 1:
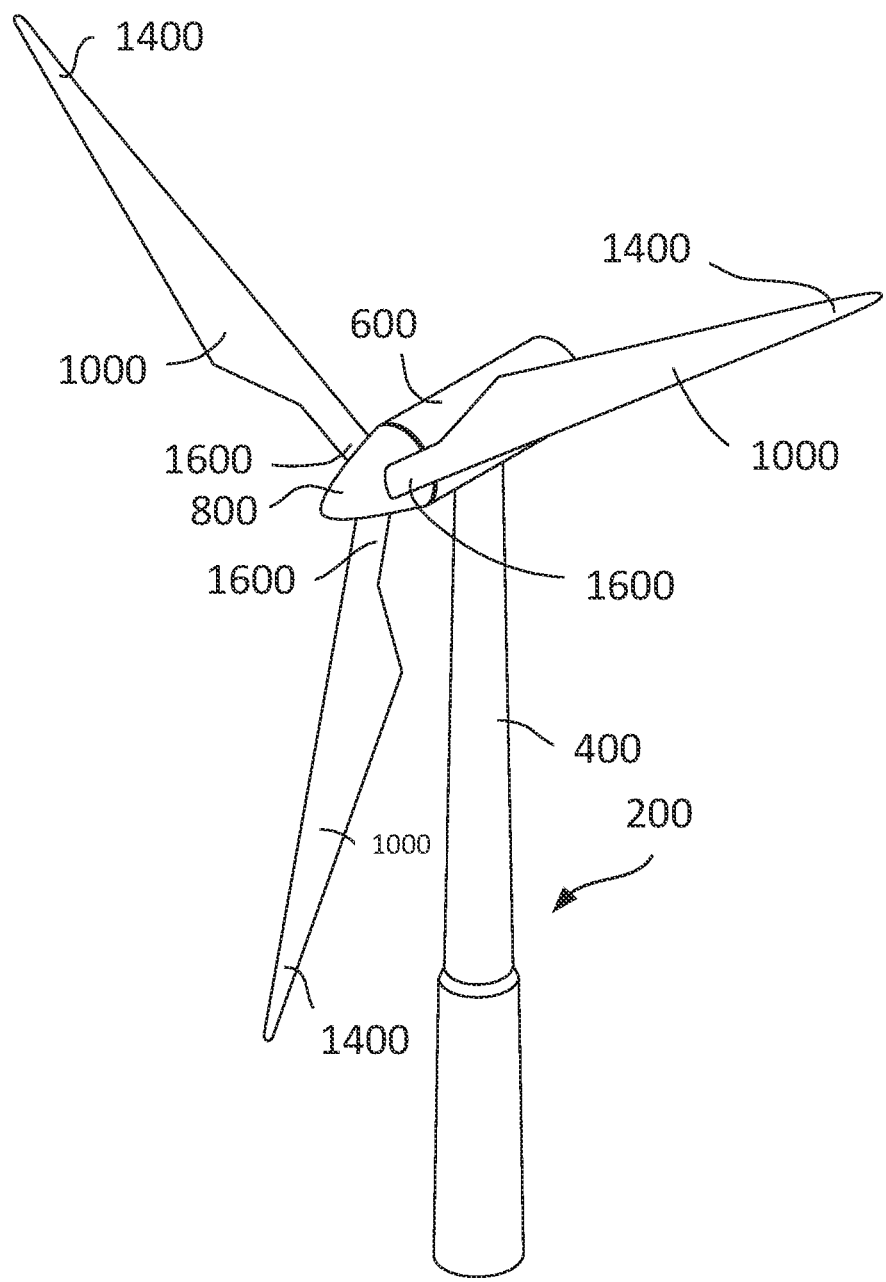

including a first primary interlayer area (31a), comprising a first number of interlayer sheets (33) comprising a first plurality of fibres (35); and a number of second interlayer areas (32), including a second primary interlayer area (32a), comprising a second number of interlayer sheets (34) comprising a second plurality of fibres (36), wherein the first number of interlayer sheets (33) is of a different characteristic than the second number of interlayer sheets (34).

19 Claims, 10 Drawing Sheets

(51) Int. Cl.
  *B29C 70/52* (2006.01)
  *B29C 70/54* (2006.01)
  *B32B 5/06* (2006.01)
  *B32B 27/08* (2006.01)
  *B32B 27/20* (2006.01)

(52) U.S. Cl.
  CPC ..... *B32B 2250/24* (2013.01); *B32B 2260/023* (2013.01); *B32B 2260/046* (2013.01); *B32B 2305/08* (2013.01); *B32B 2305/72* (2013.01); *B32B 2313/04* (2013.01); *F05B 2280/6003* (2013.01)

(58) Field of Classification Search
  CPC .......... F05B 2280/6003; F05B 2240/30; F05B 2280/2006; F05B 2280/702; F05B 2280/6013; F05B 2230/50; F05B 2240/301; F05B 2280/6001; F05B 2240/302; F05B 2280/6015; F05C 2253/16; F05C 2253/22; F01D 5/12; F01D 5/147; B32B 27/08; B32B 27/20; B32B 2250/02; B32B 2250/24; B32B 2260/023; B32B 2260/046; B32B 2305/08; B32B 2305/72; B32B 2313/04; B32B 2262/106; B32B 2307/732; B32B 5/022; B29C 70/08
  See application file for complete search history.

(56) References Cited

U.S. PATENT DOCUMENTS

| | | | |
|---|---|---|---|
| 11,772,357 B2* | 10/2023 | Erdogan | .................. B32B 5/08 |
| | | | 428/413 |
| 2013/0149154 A1* | 6/2013 | Kuroiwa | ............... B29C 70/304 |
| | | | 416/146 R |
| 2014/0178204 A1 | 6/2014 | Livingston et al. | |
| 2016/0341177 A1* | 11/2016 | Bech | ..................... F03D 1/0675 |
| 2017/0082089 A1 | 3/2017 | Yarbrough et al. | |
| 2017/0226301 A1* | 8/2017 | Desbois | ................ B29B 15/122 |
| 2018/0223798 A1 | 8/2018 | Caruso et al. | |
| 2018/0345602 A1 | 12/2018 | Beraud et al. | |
| 2018/0371657 A1* | 12/2018 | Mikulecky | ............... D04H 3/12 |
| 2018/0372065 A1* | 12/2018 | Livingston | ............ F03D 1/0675 |

FOREIGN PATENT DOCUMENTS

| | | | | | |
|---|---|---|---|---|---|
| EP | 1473132 | A2 | 11/2004 | | |
| EP | 2636897 | A1 | 9/2013 | | |
| EP | 3002355 | A1 | 4/2016 | | |
| EP | 3060385 | A1 | 8/2016 | | |
| EP | 3477097 | A1 | 5/2019 | | |
| WO | 2009083531 | A1 | 7/2009 | | |
| WO | 2018029240 | A1 | 2/2018 | | |
| WO | WO-2018055063 | A1 * | 3/2018 | ............ | B29C 51/14 |
| WO | 2020/103991 | A1 | 5/2020 | | |

* cited by examiner

OPTIMIZED SPAR CAP STRUCTURE FOR WIND TURBINE BLADE

This is a National Phase Application filed under 35 U.S.C. 371 as a national stage of PCT/EP2021/061185, filed Apr. 28, 2021, an application claiming the benefit of PCT Application No. PCT/EP2020/061761, filed Apr. 28, 2020, of British Patent Application no. 2011476.5, filed on Jul. 24, 2020, and British Patent Application no. 2011495.5, filed on Jul. 24, 2020, the contents of which is hereby incorporated by reference in its entirety.

FIELD

The present disclosure relates to a spar cap for a wind turbine blade and a wind turbine blade comprising the spar cap.

BACKGROUND

Wind power provides a clean and environmentally friendly source of energy. Wind turbines usually comprise a tower, generator, gearbox, nacelle, and one or more rotor blades. The wind turbine blades capture kinetic energy of wind using known airfoil principles. Modern wind turbines may have rotor blades that exceed 90 meters in length.

The shell halves of wind turbine blades are usually manufactured using blade moulds. First, a blade gel coat or primer is applied to the mould. Subsequently, fibre reinforcement material is placed into the mould in layers followed by arrangement of other elements within the shell halves, such as core elements, load-carrying spar caps, internal shear webs and the like. The resulting shell halves are resin infused and assembled by being glued or bolted together substantially along a chord plane of the blade.

The spar caps may be laid up directly in the wind turbine blade moulds with the other fibre-reinforcing elements or in a separate offline mould, where they are resin infused and subsequently lifted into the main blade shell mould, which is then infused with resin.

The spar caps may comprise a plurality of stacked pultruded carbon fibre elements or profiles and interlayer material arranged between the pultruded carbon fibre elements. The presence of interlayers between the pultruded profiles are used for infusibility of the stack of pultruded carbon fibre elements with resin. The interlayers normally consist of glass or carbon fibre sheets to provide structural bridging and strength in the gap between neighbouring pultrusion profiles. However, the high fibre volume in the interlayer material may also results in low fracture toughness, which is one of the key aspects of building reliable spar caps for wind turbine blades.

Hence, a spar cap for a wind turbine blade having increased fracture toughness and methods for manufacturing such a spar cap would be advantageous.

SUMMARY

It is an object of the present disclosure to provide a spar cap for a wind turbine blade which at least ameliorates some of the aforementioned problems or provides a useful alternative to the prior art.

The present inventors have found that one or more of said objects may be achieved in a first aspect of the disclosure relating to a spar cap for a wind turbine blade comprising:
  a plurality of spar cap layers including
    a first spar cap layer comprising a first number of pre-cured fibre-reinforced elements, including a first primary pre-cured fibre-reinforced element; and
    a second spar cap layer comprising a second number of pre-cured fibre-reinforced elements, including a second primary pre-cured fibre-reinforced element;
    wherein each of the first and second number of pre-cured fibre reinforced elements have a length, a width and a thickness,
  a first interlayer arranged between the first spar cap layer and the second spar cap layer and comprising
    a number of first interlayer areas, including a first primary interlayer area, comprising a first number of interlayer sheets comprising a first plurality of fibres;
    a number of second interlayer areas, including a second primary interlayer area, comprising a second number of interlayer sheets comprising a second plurality of fibres;
    wherein the first number of interlayer sheets are of a different characteristic than the second number of interlayer sheets. For example, the first plurality of fibres may be of a different characteristic, such as a different type, than the second plurality of fibres.

Conventionally, interlayers for spar caps comprise one fibre material optimal for one criteria of the spar cap, such as infusibility, fracture toughness, ply drop fatigue etc. The present disclosure provides use of interlayers with at least two different characteristics, e.g. fibre types, fibre ratio, density, etc., in each interlayer. Each characteristic may provide a desired effect to the interlayer. In that way, the present disclosure allows an interlayer to be optimized for different criteria at the same time. In some embodiments the first plurality of fibres is of a different fibre type than the second plurality of fibres. In some embodiments a first fibre ratio of the first number of interlayer sheets is different than a second fibre ratio of the second number of interlayer sheets. In some embodiments a first density of the first number of interlayer sheets is different than a second density of the second number of interlayer sheets.

Particularly, it is desired that at least one interlayer area comprises a characteristic, e.g. a fibre type, which increases the fracture toughness of the spar cap to a desired level, whereas at least one interlayer area comprises characteristic, e.g. a fibre type, which provides structural reinforcement to the spar cap to a desired level. Any characteristic which can achieve the above effects may be used within the scope of the present disclosure.

In some embodiments, the first plurality of fibres comprises a plurality of polymeric filaments, such as polyester filaments, preferably thermoplastic polyester filaments or polypropylene filaments or polyethylene filaments. In some embodiments, the first plurality of fibres essentially consists of a plurality of polymeric filaments, such as polyester filaments, preferably thermoplastic polyester filaments or polypropylene filaments or polyethylene filaments. The use of polymeric filaments in the interlayer promotes resin infusion, provides wetting of the area between carbon pultrusions and reduces the amount of defects. In preferred embodiments, the plurality of first fibres are polyester fibres/filaments.

In some embodiments, the second plurality of fibres in the second number of interlayer sheets comprises glass fibres and/or carbon fibres. In some embodiments, the second plurality of fibres essentially consist of glass fibres and/or carbon fibres. In other embodiments, the second plurality of fibres essentially consist of glass fibres. In other embodiments, the second plurality of fibres essentially consist of carbon fibres. Carbon fibres and glass fibre both provides structural bridging and strength in the gap between neighbouring fibre-reinforced elements.

In some embodiments, the first plurality of fibres and/or the second plurality of fibres comprises a plurality of conductive strands, such as copper strands. In some embodiments, the first plurality of fibres essentially consists of a plurality of conductive strands, such as copper strands. In some embodiments, the second plurality of fibres essentially consists of a plurality of conductive strands, such as copper strands.

A spar cap according to the present disclosure, comprises a plurality of spar cap layers including
- a first spar cap layer comprising a first number of pre-cured fibre-reinforced elements, including a first primary pre-cured fibre-reinforced element; and
- a second spar cap layer comprising a second number of pre-cured fibre-reinforced elements, including a second primary pre-cured fibre-reinforced element;

The plurality of spar cap layers may further include a third, fourth, fifth etc. spar cap layer, comprising respective third, fourth, fifth etc. number of pre-cured fibre-reinforced elements.

The number of pre-cured fibre-reinforced elements in each spar cap layer is at least one. However, the number of pre-cured fibre-reinforced elements in each spar cap layer may also be more than one, such as two, three, four, five or more. Thus, a first precured-fibre reinforced elements may comprise a first primary, first secondary, first tertiary, first quaternary, first quinary etc. pre-cured fibre-reinforced element. In the same way, a second pre-cured fibre-reinforced element, may comprise a second primary, second secondary, second tertiary, second quaternary, second quinary etc.

Each of the plurality of pre-cured fibre reinforced elements have a length, a width and a thickness. Preferably, the length is longer than the width and the width is longer than the thickness. The plurality of pre-cured fibre-reinforced elements may all have substantially the same length, substantially the same width and/or substantially the same thickness. However, the length, width and/or thickness may also differ between the plurality of pre-cured fibre-reinforced elements. In preferred embodiments, the plurality of pre-cured fibre-reinforced elements all have the same thickness and width, but not the same length. The length of the pre-cured fibre-reinforced elements in each spar cap layer may for example increase from the a lower surface of the spar cap to an upper surface of the spar cap (when the spar cap is arranged in the cavity of an open blade shell, arranged horizontally). For example, the lower surface may designate being closest to the blade shell, and the upper surface may designate being away from the blade shell.

Each spar cap layer also has a length, a width and a thickness. Preferably, the length is longer than the width and the width is longer than the thickness. The spar cap layers may all have substantially the same length, substantially the same width and/or substantially the same thickness. However, the length, width and/or thickness may also differ between the spar cap layers. In preferred embodiments, the spar cap layers all have the same thickness and width, but not the same length. The length of the spar cap layers may for example increase from the a lower surface of the spar cap to an upper surface of the spar cap (when the spar cap is arranged in the cavity of an open blade shell, arranged horizontally).

The length, width and/or thickness of a spar cap layer may be defined by the number and arrangement of pre-cured fibre-reinforced elements in that spar cap layer.

In preferred embodiments, a spar cap layer comprises a plurality of pre-cured fibre-reinforced elements arranged adjacent to each other, e.g. side by side. For example, the first spar cap layer may comprise a first primary pre-cured fibre-reinforced element and a first secondary pre-cured fibre-reinforced element arranged adjacent to the first primary pre-cured fibre reinforced element, such that a first side of the first primary pre-cured fibre-reinforced element defined by the thickness and length of the first primary pre-cured fibre-reinforced element, is adjacent to a second side of the first secondary pre-cured fibre-reinforced element, defined by the thickness and length of the first secondary pre-cured fibre-reinforced element. Alternatively or additionally, the second spar cap layer may comprise a second primary pre-cured fibre-reinforced element and a second secondary pre-cured fibre-reinforced element arranged adjacent to the second primary pre-cured fibre reinforced element, such that a first side of the first primary pre-cured fibre-reinforced element defined by the thickness and length of the second primary pre-cured fibre-reinforced element, is adjacent to a second side of the second secondary pre-cured fibre-reinforced element, defined by the thickness and length of the second secondary pre-cured fibre-reinforced element.

A spar cap layer may also or alternatively comprise a plurality of pre-cured fibre-reinforced elements arranged adjacent to each other, such that an end of one pre-cured fibre-reinforced element, e.g. the first primary pre-cured fibre reinforced element or the second primary pre-cured fibre reinforced element, wherein the end is defined by the thickness and width of the one pre-cured fibre-reinforced elements, is arranged adjacent to an end of another pre-cured fibre-reinforced elements, e.g. the first secondary pre-cured fibre reinforced element or the second secondary pre-cured fibre reinforced element, wherein that end is defined by the thickness and width of the other pre-cured fibre-reinforced elements.

The plurality of spar cap layers, including the first spar cap layer and the second spar cap layer, each have a first surface area and an opposite second surface area. For example, the first surface area of the first spar cap layer may be defined by the width and length of the first spar cap layer and/or the first surface area of the second spar cap layer may be defined by the width and length of the second spar cap layer. The first and/or second surface areas may be defined by the aggregate first and/or second surfaces of pre-cured fibre-reinforced elements arranged adjacent to each other in each spar cap layer.

In some embodiments, each of the plurality of pre-cured fibre reinforced elements are pultruded carbon planks, such as pultruded carbon fibre reinforced plastic planks.

The length of each pre-cured fibre-reinforced element may be longer than the width and the width may be larger than the thickness. The length may be more than 2 meters, such as more than 5 meters, such as more than 10 meters, such as more than 20 meters, such as more than 40 meters, such as more than 70 meters. The width may be between 20-200 mm, such as between 50-150 mm, such as 100 mm. The thickness may be between 2-10 mm, such as 5 mm.

In some embodiments, the pre-cured fibre-reinforced elements comprises reinforcement fibres and a first cured resin. Preferably, the reinforcement fibres are carbon fibres. The pre-cured fibre-reinforced elements may be pultruded elements, e.g. pultruded planks, such as pultruded fibre reinforced plastic planks. For example, the pre-cured fibre-reinforced elements may be pultruded carbon planks, such as pultruded carbon fibre reinforced plastic planks. However, in some embodiments, the pre-cured fibre-reinforced elements may be extruded elements, e.g. comprising carbon fibres and the first cured resin.

The spar cap comprises at least one interlayer, e.g. the first interlayer. However, the spar cap layer preferably includes a plurality of interlayers, e.g. such that all spar cap layers, in case of more than two, are separated by an interlayer. Thus, the spar cap comprises at least the first interlayer, but may also comprise a second interlayer, a third interlayer, a fourth interlayer etc.

Each interlayer may have a length, a width and a thickness, wherein the width and length of an interlayer is preferably substantially the same as the width and length of the spar cap layers in which it is arranged between. Since the spar cap layers may differ in size, an interlayer is preferably substantially the same size as the smallest of the two spar cap layer in which it is arranged between. However, an interlayer may also be smaller than the smallest spar cap layer in which it is arranged between.

Each of the interlayers may have a first surface area and an opposite second surface area, wherein the first surface area of each interlayer is defined by the width and length of that interlayer.

In some embodiments, the first surface area of the first interlayer is in contact with the second surface area of the first spar cap layer, and the second surface area of the first interlayer is in contact with the first surface area of the second spar cap layer.

One or more of the interlayers of the spar cap, including the first interlayer, may comprise:

a number of first interlayer areas, including a first primary interlayer area, comprising a first number of interlayer sheets comprising a first plurality of fibres;

a number of second interlayer areas, including a second primary interlayer area, comprising a second number of interlayer sheets comprising a second plurality of fibres.

In some embodiments, each interlayer comprises only one first interlayer area, i.e. the first primary interlayer area. However, in other embodiments, an interlayer comprises a plurality of first interlayer areas, including the first primary interlayer area and a first secondary interlayer area, and optionally including a first tertiary interlayer area, a first quaternary interlayer area etc. In the same way, each interlayer may comprise only one second interlayer area, i.e. the second primary interlayer area. However, in other embodiments, an interlayer comprises a plurality of second interlayer areas, including the second primary interlayer area and a second secondary interlayer area, and optionally including a second tertiary interlayer area, a second quaternary interlayer area etc.

One or more interlayer sheets, such as the first and/or second number of interlayer sheets may be unidirectional fabrics, bidirectional/biaxial fabrics or tridirectional/triaxial fabrics. In a unidirectional sheet, the plurality of fibres are all arranged along a first direction. In a bidirectional/biaxial sheet, a plurality of fibres are arranged along a first direction and a plurality of fibres are arranged along a second direction, e.g. perpendicularly to the first direction, on top of the plurality of fibres arranged along the first direction. In a tridirectional/triaxial sheet, a plurality of fibres are arranged along a first direction, a plurality of fibres are arranged along a second direction and positioned on top of the plurality of fibres arranged along the first direction, and a plurality of fibres are arranged along a third direction, on top of the fibres arranged along the second direction. The fibres in a unidirectional, bidirectional or tridirectional fabric may be maintained relative to each other by a binding agent or be stitched together by a thread. Unidirectional, bidirectional or tridirectional fabrics may comprise different types of fibres, such as one, two or three different types of fibres, including the first and/or second plurality of fibres.

In some embodiments, one or more interlayer sheets, such as the first and/or second number of interlayer sheets, may be veils comprising randomly oriented fibres. A veil is a thin, fluffy layer essentially consisting of randomly arranged fibres. The fibres in the veil may be maintained relative to each other by a binding agent or be stitched together by a thread. A veil often has high permeability, promotes resin infusion and have good adhesion properties. A veil may comprise different types of fibres, such as one, two or three different types of fibres, including the first and/or second plurality of fibres.

In some embodiments, the first and/or second number of interlayer sheets are nets, e.g. comprising woven fibres. A net may comprise one type of fibres. A net may comprise different types of fibres, such as two or three different types of fibres, e.g. including the first and/or second plurality of fibres.

In some embodiments, the first and/or second number of interlayer sheets are meshes or grids.

In some embodiments, the first plurality of fibres and/or the second plurality of fibres are maintained relative to each other by a binding agent or are stitched together by a thread.

In a preferred embodiment, the first number of interlayer sheets are polyester veils and the second number of interlayer sheets are bidirectional glass-fibre fabrics. Such an interlayer may provide the desired structural integrity and fracture toughness to the spar cap. Furthermore, first number of interlayer sheets in the interlayer sheet promotes resin infusion and adhesion between pre-cured fibre-reinforced elements and the interlayer.

Each interlayer area is made up of a number of interlayer sheets. For example, the number of first interlayer areas comprises a first number of interlayer sheets and/or the number of second interlayer areas comprises a second number of interlayer sheets. The number of interlayer sheets in an interlayer may differ, even though the final composition/arrangement of the first and second plurality of fibres in the interlayer is substantially the same.

One interlayer sheet may be sufficient for an interlayer to be arranged between two spar cap layers. However, several interlayer sheets may also be used between two spar cap layers, together forming an interlayer. According to the present disclosure at least two interlayer sheets are preferably used, at least one first interlayer sheet comprising the first plurality of fibres and at least one second interlayer sheet comprising the second plurality of fibres. Alternatively, a single interlayer sheet comprising different characteristics in different areas could be used. In practice, it may be easier to use two types of interlayer sheets, one comprising the first plurality of fibres and the other comprising the second plurality of fibres.

In some embodiments, each interlayer area is made up of one interlayer sheet. However, in other embodiments, each interlayer area may be made up of a plurality of interlayer sheets.

In some embodiments, the first number of interlayer sheets and the second number of interlayer sheets are arranged adjacent to each other in the same plane, such that adjacent edges of the interlayer sheets are either in close proximity or contacted with each other. In other embodiments, the first number of interlayer sheets and the second number of interlayer sheets overlap each other in areas where they meet. In this way, the interlayers have a thickness in overlapping areas which is greater than the thickness of the remaining interlayer.

In preferred embodiments, the characteristic, such as the fibre type, the fibre ratio and/or the density, in an interlayer, e.g. the first interlayer, varies along the length of the spar cap. In that way, the optimal interlayer material can be chosen along the length of the spar cap, in that way optimizing the spar cap for a wing turbine blade, which have a different risk for failure along the span. In other embodiments, the interlayer material may alternatively or additionally be varied along the width of the spar cap.

In some embodiments, the first primary interlayer area extends along a first part of the length of the first interlayer and the second primary interlayer area extends along a second part of the length of the first interlayer. In some embodiments, the first primary interlayer area extends along the whole width of the first interlayer. In some embodiments, the second primary interlayer area extends along the whole width of the first interlayer.

In some embodiments, the first primary interlayer area extends along a first part of the width of the first interlayer and wherein the second primary interlayer area extends along a second part of the width of the first interlayer. In some embodiments, the first primary interlayer area extends along the whole length of the first interlayer. In some embodiments, the second primary interlayer area extends along the whole length of the first interlayer.

In some embodiments, the second primary interlayer area is surrounded by the first primary interlayer area. In some embodiments, the first primary interlayer area forms at least part of a perimeter of the first interlayer i.e. is arranged proximal to the edge of the first interlayer.

In some embodiments, the first interlayer comprises a plurality of first interlayer areas, including the first primary interlayer area and a first secondary interlayer area.

In some embodiments, the second primary interlayer area is located between the first primary interlayer area and the first secondary interlayer area.

In some embodiments, the first interlayer comprises a plurality of second interlayer areas, including the second primary interlayer area and e.g. a second secondary interlayer area.

In some embodiments, the first plurality of interlayer areas and the second plurality of interlayer areas each extends along part of the length of the first interlayer sheet, and wherein the first plurality of interlayer areas and the second plurality of interlayer areas are alternating along the length of the first interlayer sheet. In some embodiments, the first plurality of interlayer areas and the second plurality of interlayer areas each extends along the whole width of the first interlayer sheet.

In some embodiments, the first plurality of interlayer areas and the second plurality of interlayer areas each extends along part of the width of the first interlayer sheet, and wherein the first plurality of interlayer areas and the second plurality of interlayer areas are alternating along the width of the first interlayer sheet. In some embodiments, the first plurality of interlayer areas and the second plurality of interlayer areas each extends along the whole length of the first interlayer sheet.

In some embodiments, the first interlayer comprises a plurality of carbon fibres forming part of the first surface area of the first interlayer as well as second surface area of the first interlayer. Thus, the plurality of carbon fibres extend through the first interlayer. In some embodiments, the carbon fibres extend through a single interlayer sheet. However, in embodiment where the first and second interlayer sheets overlap, the carbon fibres may extend through the overlapping interlayer sheets i.e. through two interlayer sheets arranged on top of each other. In this way, electrical conductivity through the first interlayer may be obtained, which facilitates electron flow between elements, such as pultruded elements, when sandwiched therebetween.

An interlayer according to the present disclosure may be arranged between the pre-cured fibre reinforced elements in a width direction (horizontal). However, it may also be arranged between pre-cured fibre-reinforced elements in a thickness direction (vertical).

In preferred embodiments, the plurality of pre-cured fibre-reinforced elements and the number of interlayer sheets are embedded in a second cured resin, to form the spar cap. The spar cap may be laid up directly in a wind turbine blade mould with other fibre-reinforcing elements and then infused with the second resin or it may be laid up in a separate offline mould, where it is infused with the second resin and then subsequently lifted into the main blade shell mould.

In a second aspect, the present disclosure relates to a wind turbine blade comprising a spar cap according to the first aspect of the present disclosure.

The spar cap may be integrally formed with or attached to the blade shell of the wind turbine blade. The wind turbine blade preferably comprises two spar caps. For example, the wind turbine blade may comprise a first spar cap in a first blade shell part and a second spar cap in a second blade shell part. The first spar cap may be a pressure side spar cap of a pressure side blade shell part. The second spar cap may be a suction side spar cap of a suction side blade shell part.

In some embodiments, the wind turbine blade comprises a first spar cap integrally formed with or attached to a pressure side of the wind turbine blade, a second spar cap integrally formed with or attached to a suction side of the wind turbine blade. The wind turbine blade may comprise one or more shear webs connected between first spar cap and the second spar cap.

In a third aspect, the present disclosure relates to a method of manufacturing a spar cap, such as the spar cap of the first aspect of the present disclosure. The method comprises the steps of:
  a) providing a plurality of pre-cured fibre-reinforced elements including a first pre-cured fibre-reinforced element and a second pre-cured fibre-reinforced element;
  b) providing a plurality of interlayers, including a first interlayer, e.g. the first interlayer according to the first aspect of the present disclosure;
  c) arranging the first interlayer in between the first pre-cured fibre-reinforced element and the second pre-cured fibre-reinforced element such that the pre-cured fibre-reinforced elements are separated by the first interlayer;
  d) infusing the first pre-cured fibre-reinforced elements, the second pre-cured fibre-reinforced element and the first interlayer with a first resin;
  e) curing the first resin in order form the spar cap.

In some embodiments, step c) of manufacturing a spar cap include arranging the plurality of pre-cured fibre-reinforced elements and interlayer in a pre-form mould.

In some embodiments, step c) of manufacturing a spar cap include arranging the plurality of pre-cured fibre-reinforced elements and interlayer in a wind turbine blade mould.

In some embodiments, step d) include covering the plurality of pre-cured fibre reinforced elements and interlayer in the pre-form mould with a cover, such as a vacuum bag, to form a mould cavity and supplying the first resin into the mould cavity.

In some embodiments, step d) include covering the wind turbine blade mould with a cover, such as a vacuum bag, to form a mould cavity and supplying the first resin into the mould cavity.

The step of infusing the blade mould cavity with resin is preferably based on vacuum assisted resin transfer moulding (VARMT). When the desired elements have been arranged in the pre-form mould or wind turbine blade mould, a vacuum bag may be arranged on top of the elements arranged on the moulding surface and the vacuum bag may be sealed against the blade mould. Then the blade mould cavity within the sealed vacuum bag may be infused with resin. Optionally, the step of resin infusion is followed by curing.

In some embodiments, the first cured resin and the second cured resin are of the same type, i.e. the cured resin of the pre-cured fibre-reinforced elements are the same type as the cured resin embedding the pre-cured fibre-reinforced elements and the interlayer material between the pre-cured fibre-reinforced elements. In other embodiments, the first cured resin and the second cured resin are different types of resin.

It will be understood that any of the above-described features may be combined in any embodiment of the disclosure. In particular, embodiments described with regards to the spar cap may also apply to the wind turbine blade, and vice versa. Furthermore, the embodiments described with regards to the spar cap and wind turbine blade may also apply to the method of manufacturing a spar cap or wind turbine blade and vice versa.

DETAILED DESCRIPTION

Embodiments of the disclosure will be described in more detail in the following with regards to the accompanying figures. The figures show one way of implementing the present disclosure and are not to be construed as being limiting to other possible embodiments falling within the scope of the attached claim set.

Figure 2:
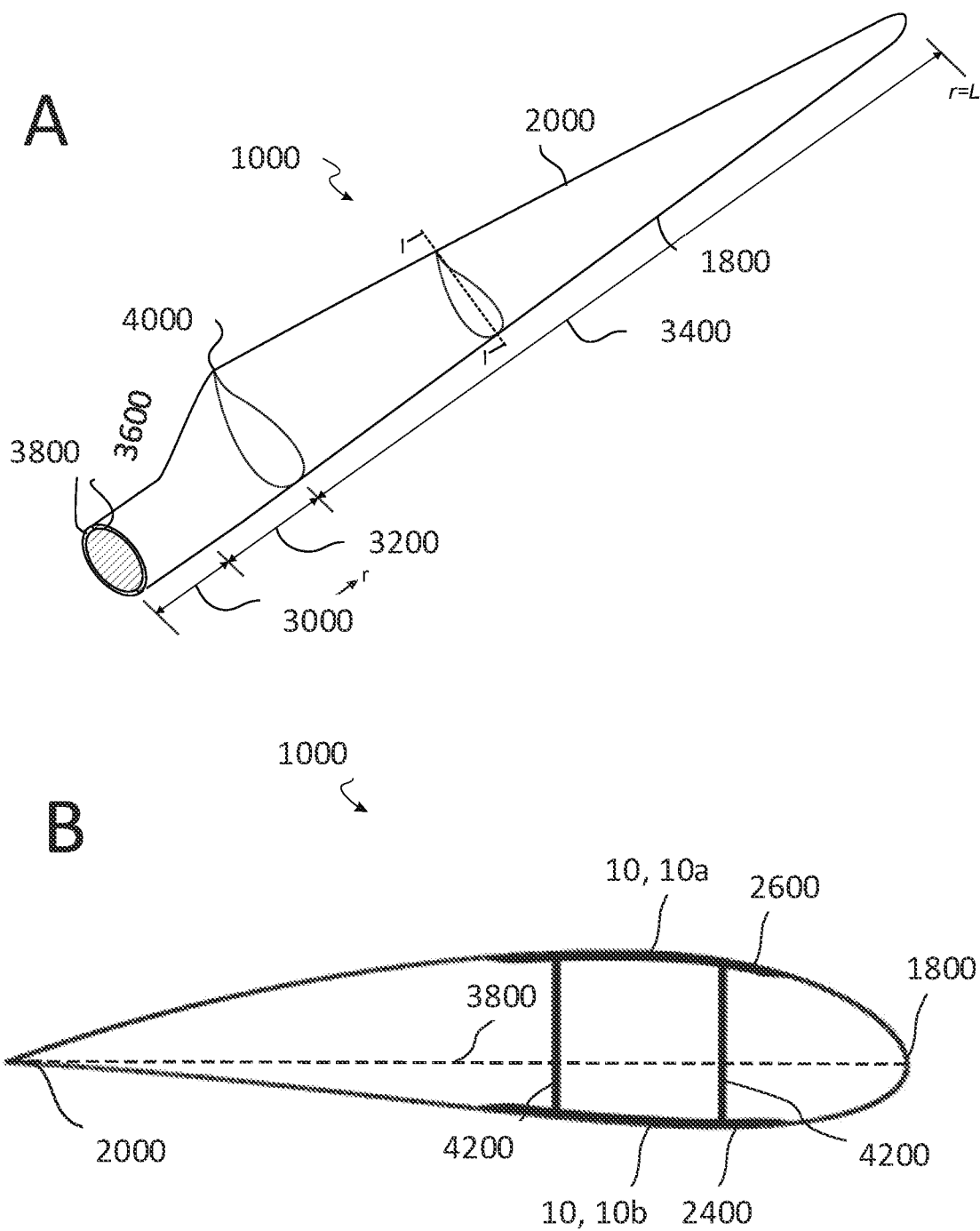
Figure 3:
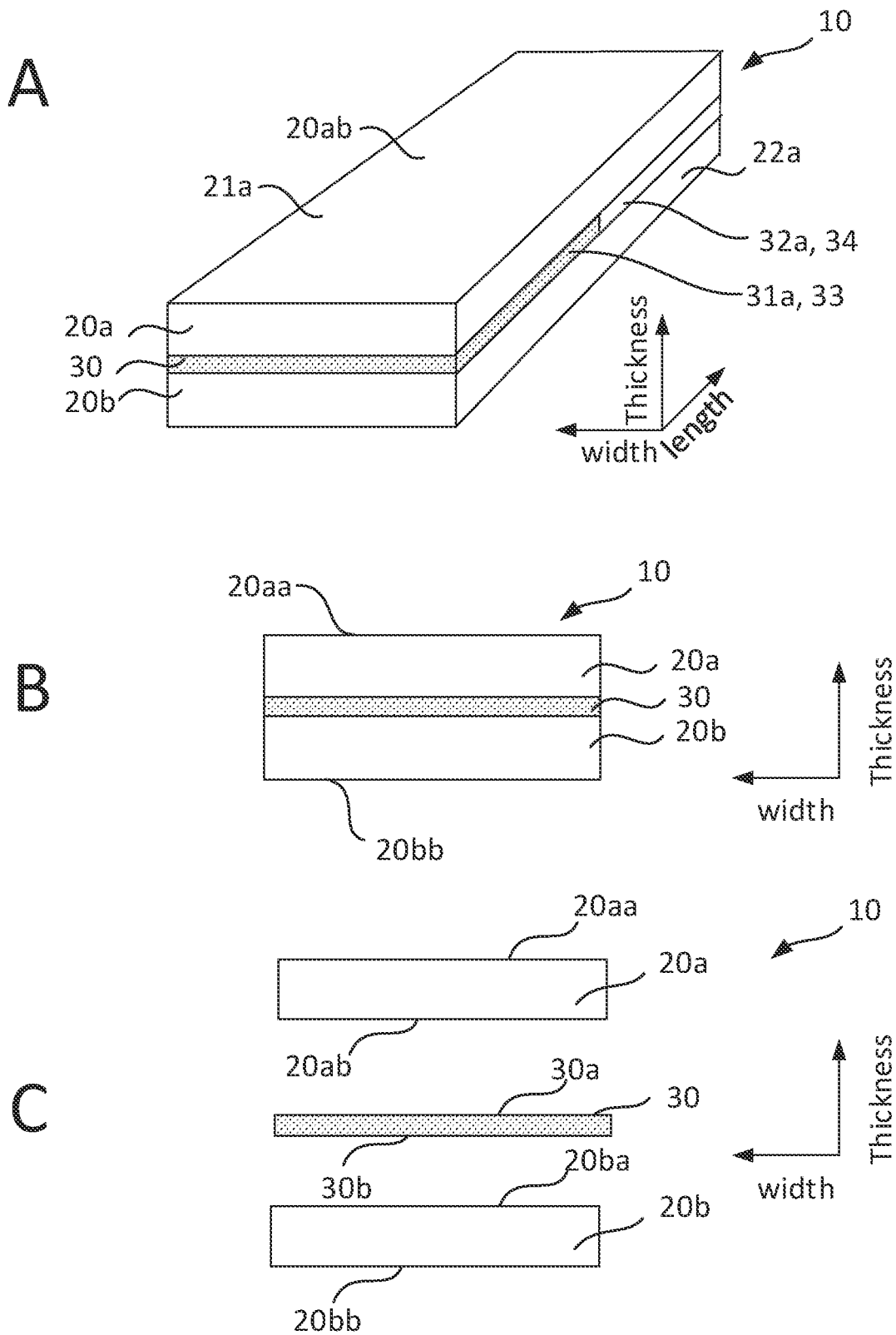
Figure 4:
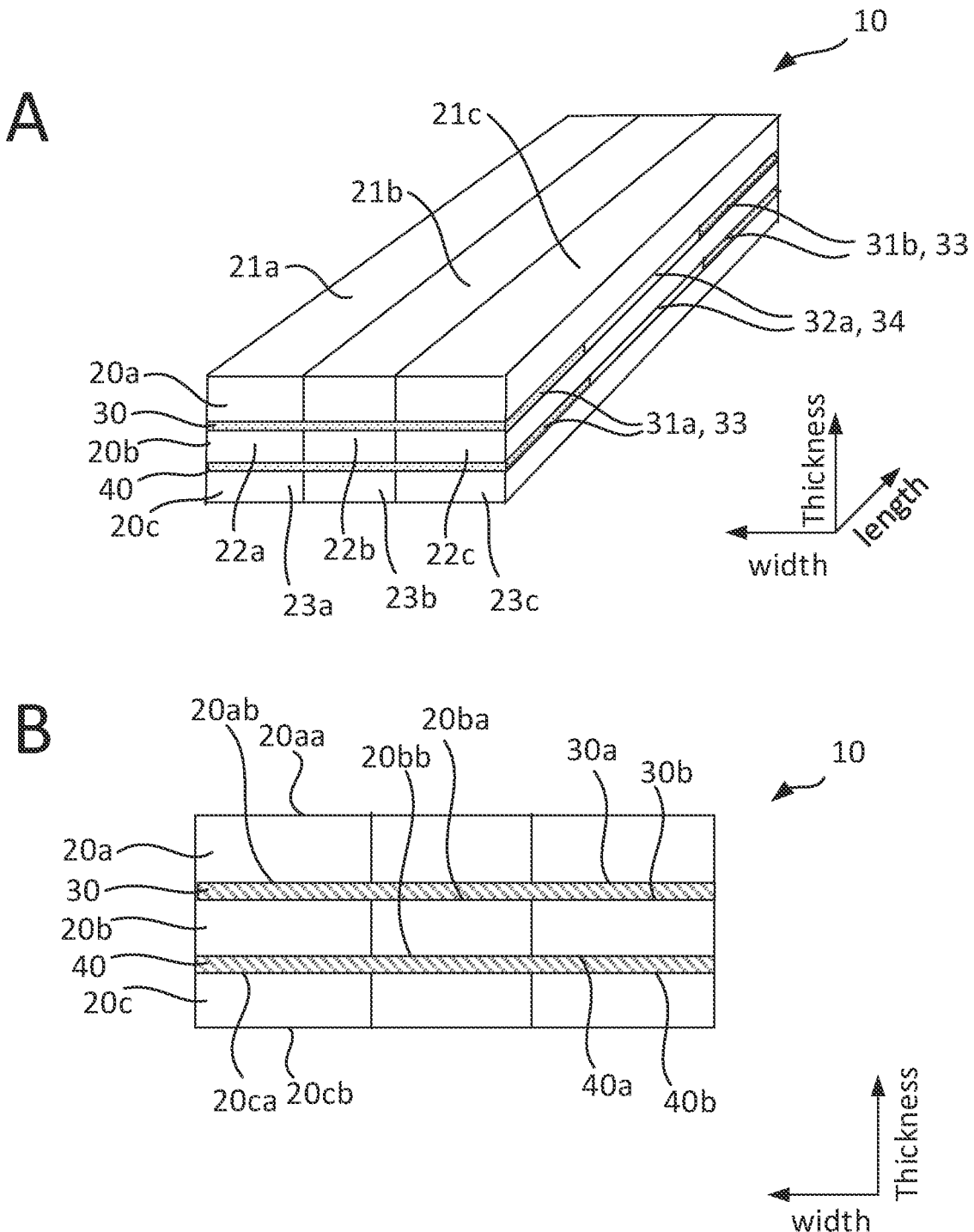
Figure 5:
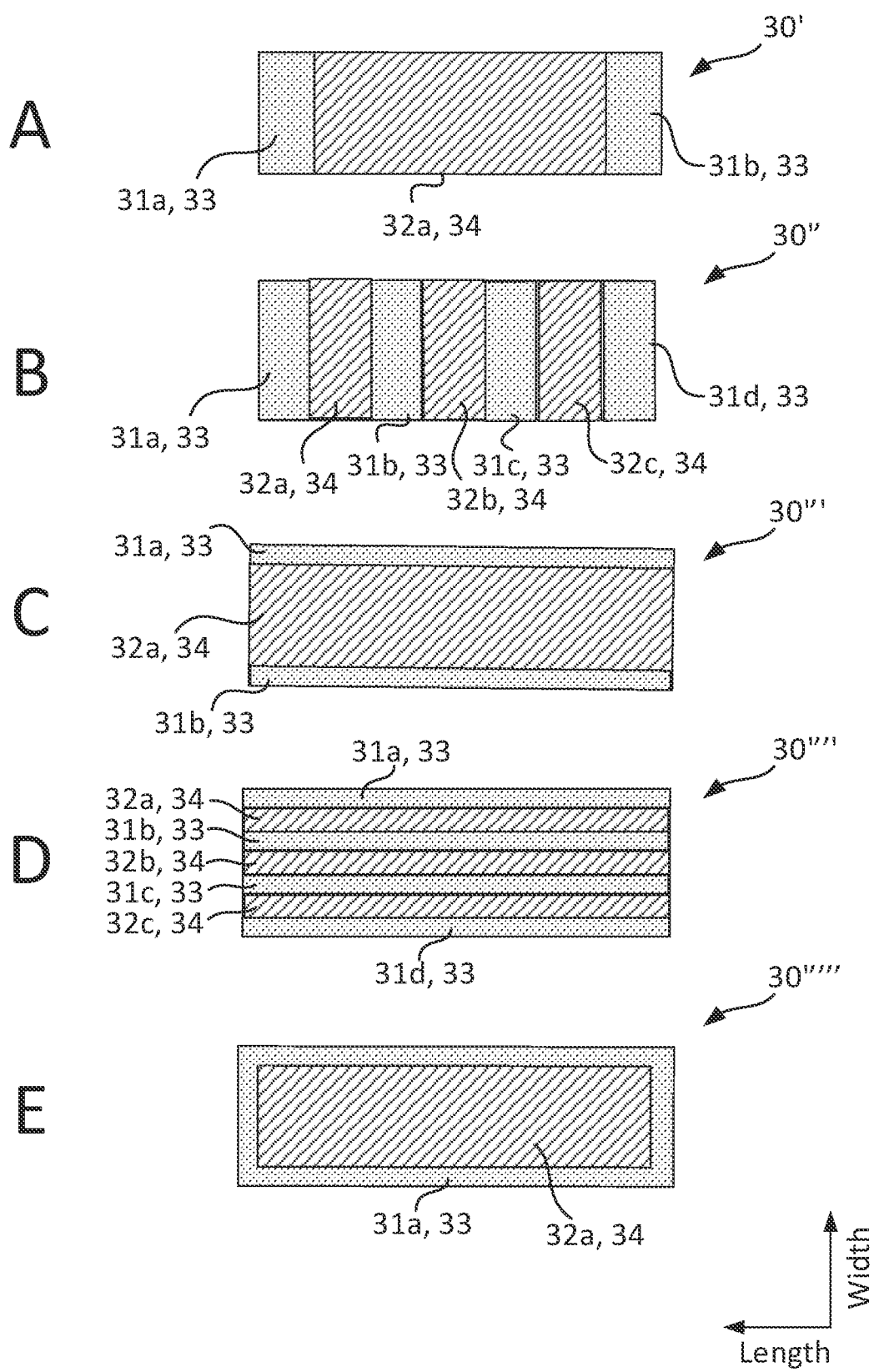
Figure 6:
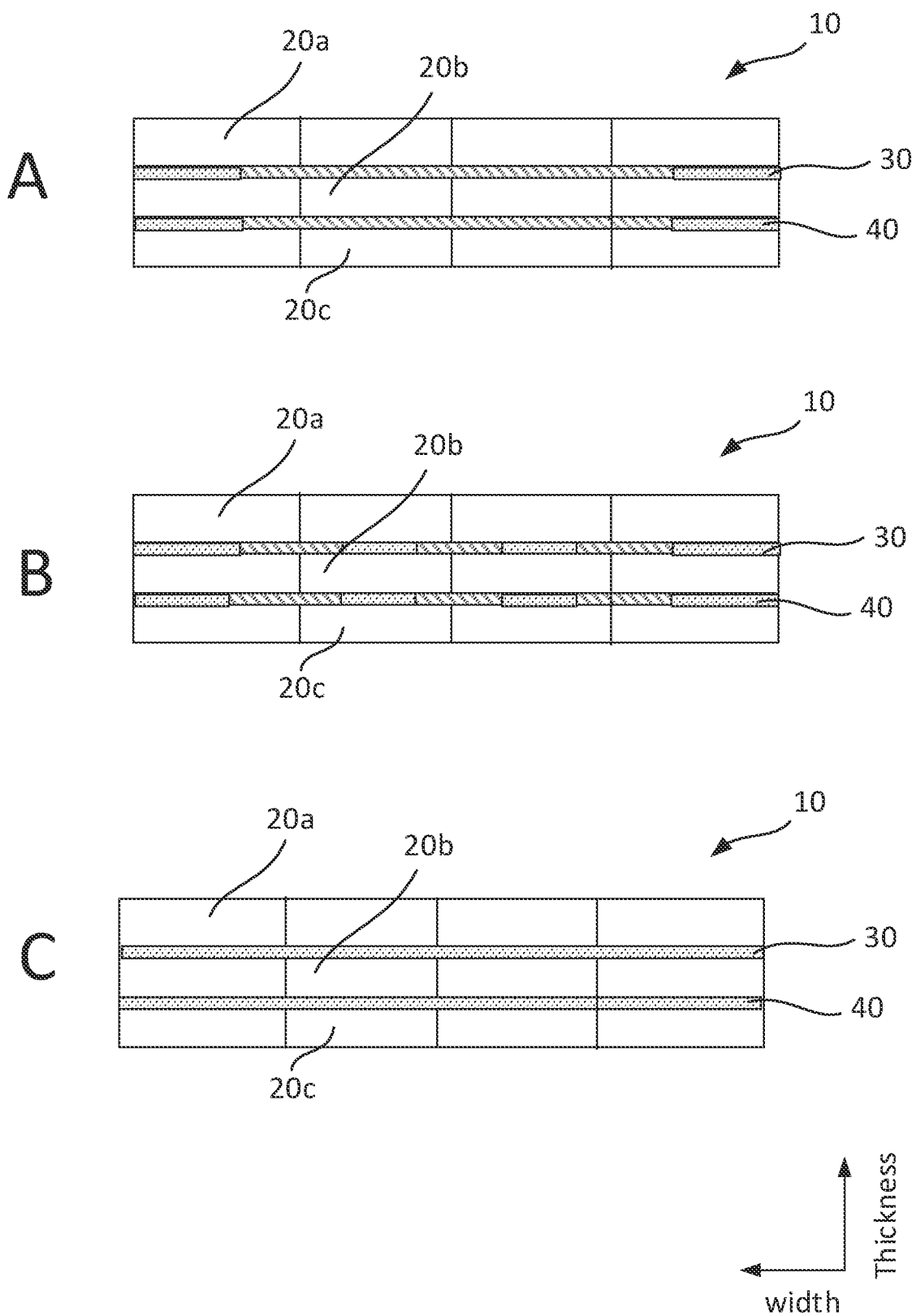
Figure 7:
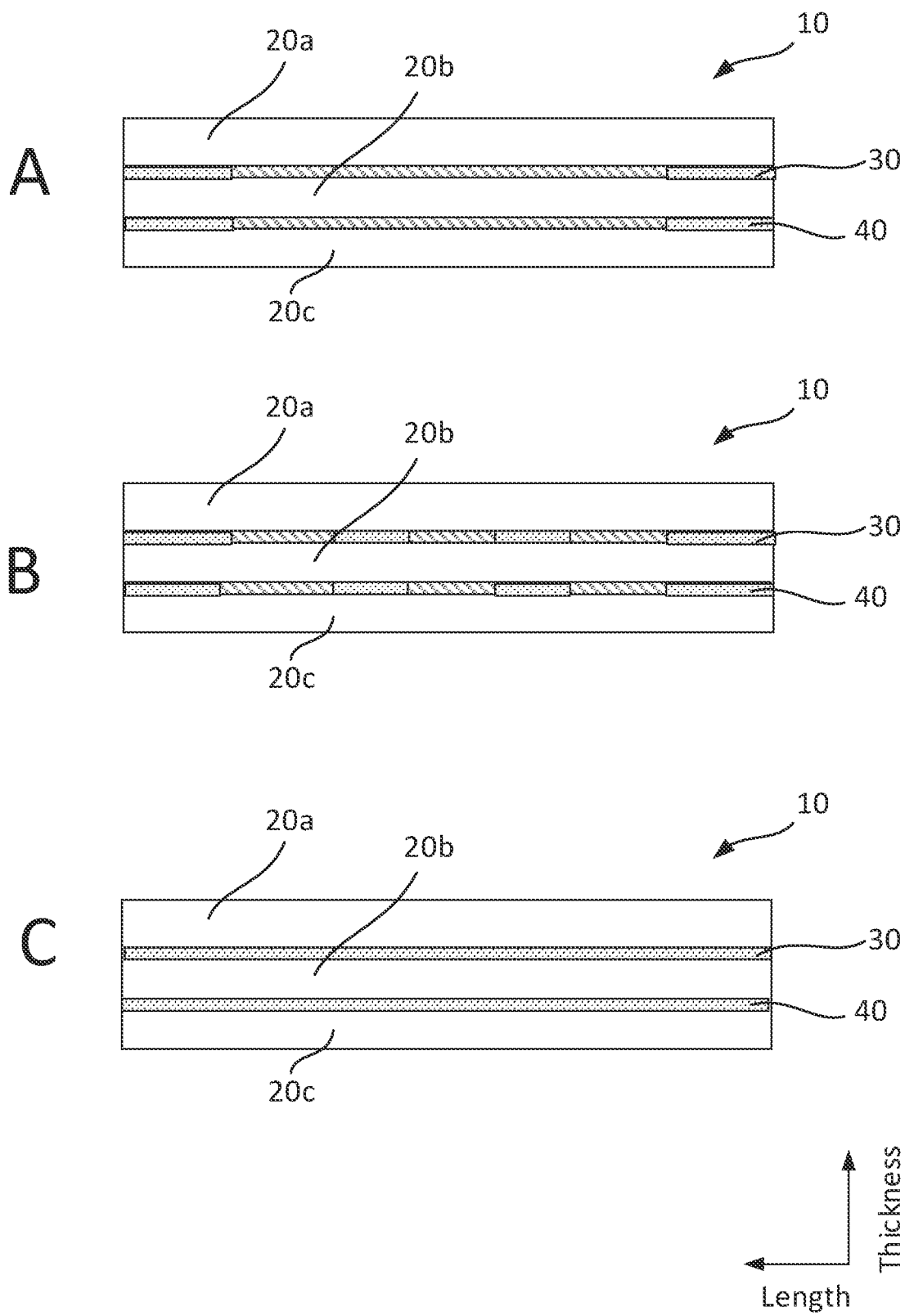
Figure 8:
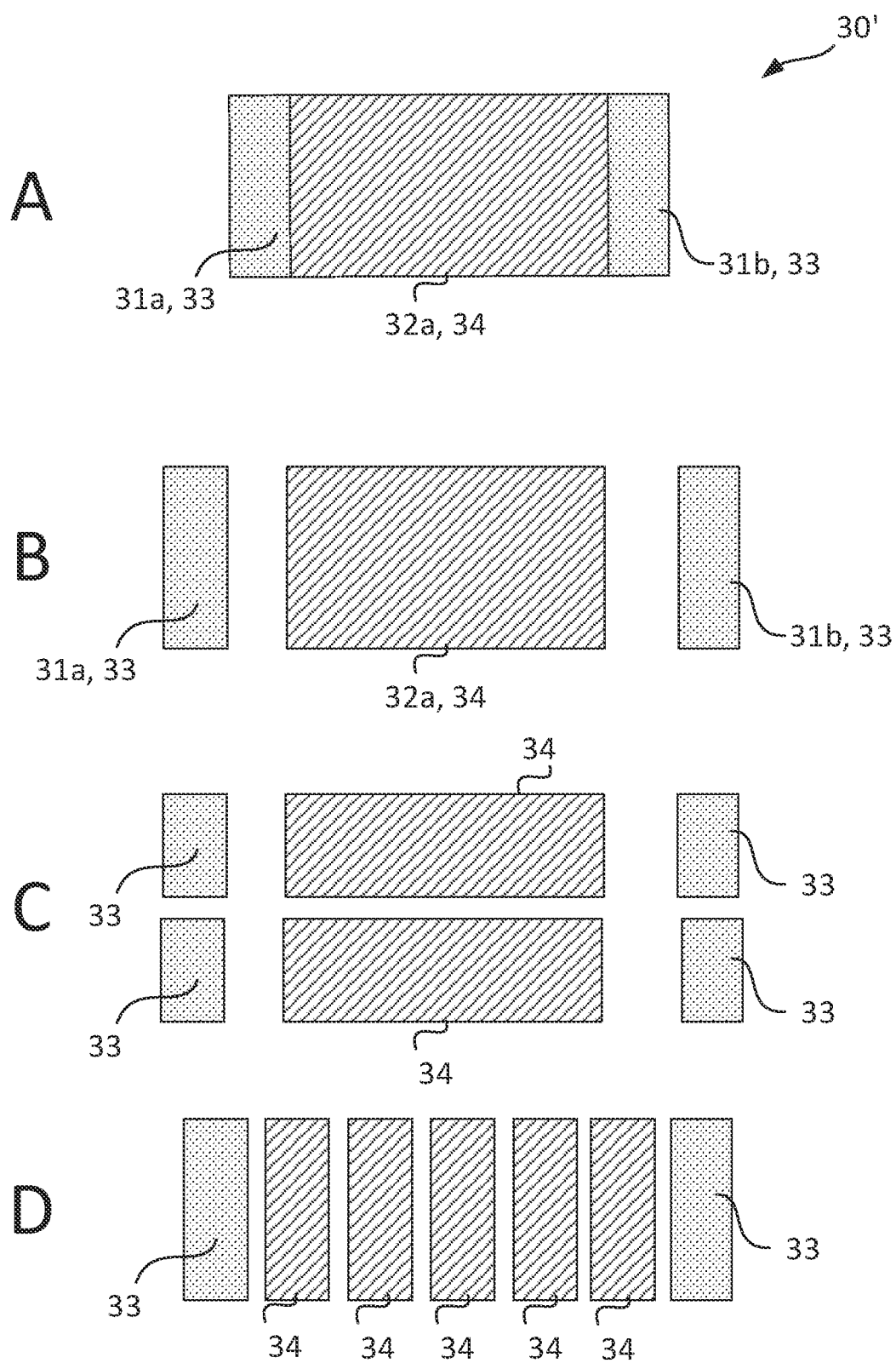
Figure 9:
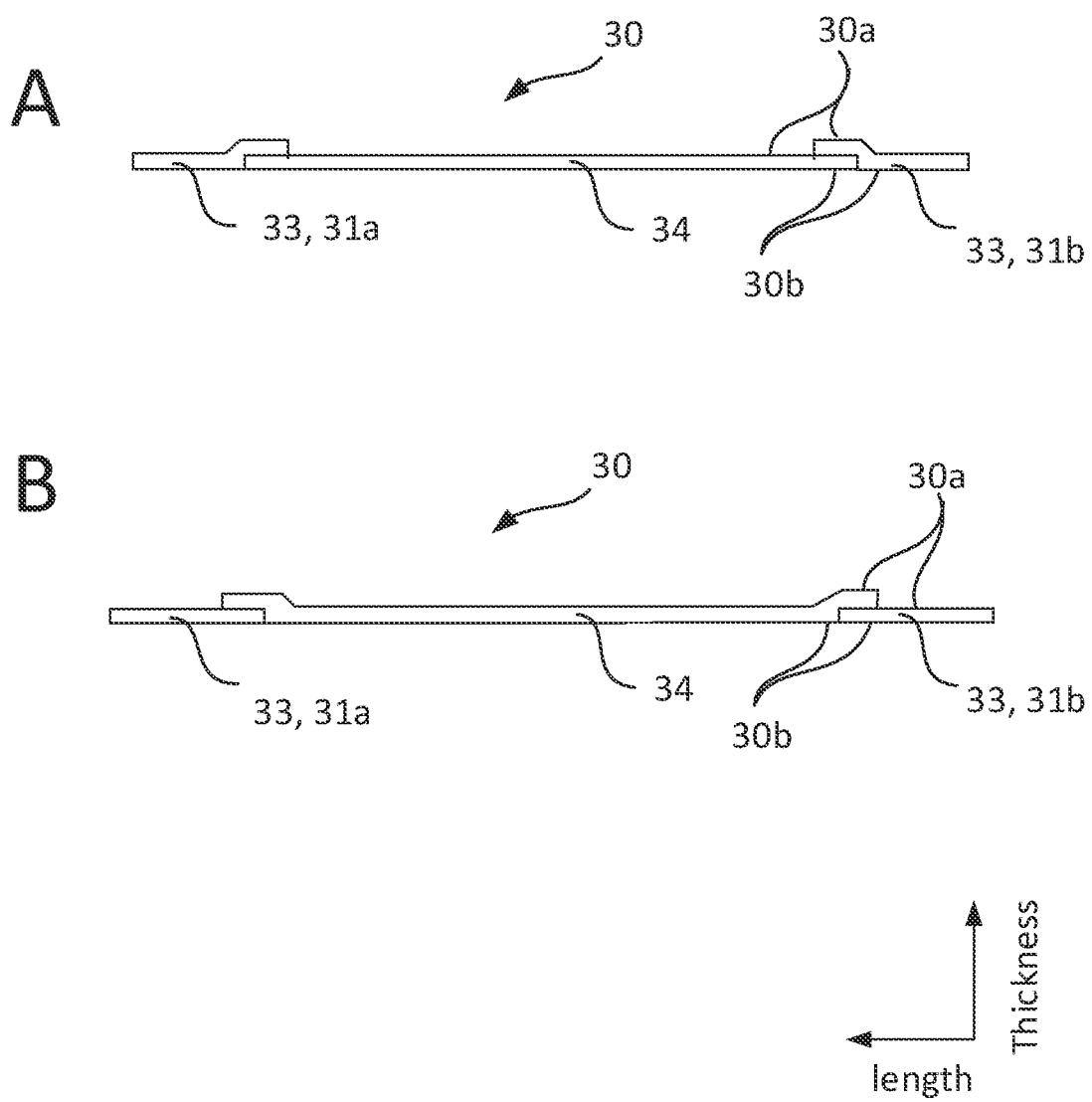
Figure 10:
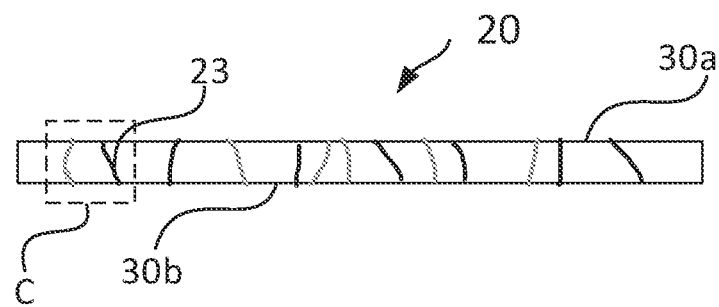
Figure 10:
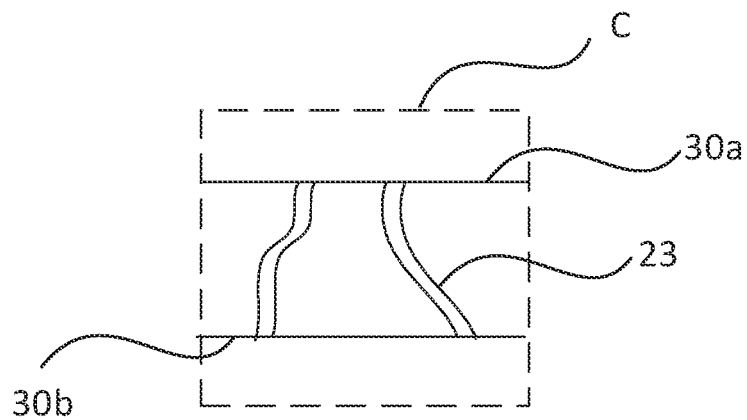

FIG. 1 is a schematic diagram illustrating a wind turbine,

FIG. 2 is a schematic diagram illustrating a wind turbine blade and a spar cap structure arranged within the wind turbine blade, FIG. 3 is a schematic diagram illustrating the simplest embodiment of a spar cap, FIG. 4 is a schematic diagram illustrating another embodiment of a spar cap, FIG. 5 is a schematic diagram illustrating a top view of different embodiments of an interlayer, FIG. 6 is a schematic diagram illustrating a front view of different embodiments of a spar cap, FIG. 7 is a schematic diagram illustrating a side view of different embodiments of a spar cap, and FIG. 8 is a schematic diagram illustrating a top view of different embodiments of interlayer sheets, FIG. 9 is a schematic diagram illustrating a cross-sectional view of an embodiment of an interlayer sheet with overlapping sections, and FIG. 10 is a schematic diagram illustrating a cross-sectional view of an embodiment of an interlayer sheet with carbon fibres extending through it.

DETAILED DESCRIPTION

Various exemplary embodiments and details are described hereinafter, with reference to the figures when relevant. It should be noted that the figures may or may not be drawn to scale and that elements of similar structures or functions are represented by like reference numerals throughout the figures. It should also be noted that the figures are only intended to facilitate the description of the embodiments. They are not intended as an exhaustive description of the disclosure or as a limitation on the scope of the disclosure. In addition, an illustrated embodiment needs not have all the aspects or advantages shown. An aspect or an advantage described in conjunction with a particular embodiment is not necessarily limited to that embodiment and can be practiced in any other embodiments even if not so illustrated, or if not so explicitly described.

FIG. 1 illustrates a conventional modern upwind wind turbine according to the so-called "Danish concept" with a tower 400, a nacelle 600 and a rotor with a substantially horizontal rotor shaft. The rotor includes a hub 800 and three blades 1000 extending radially from the hub 800, each having a blade root 1600 nearest the hub and a blade tip 1400 furthest from the hub 800.

FIG. 2A shows a schematic view of a first embodiment of a wind turbine blade 1000. The wind turbine blade 1000 has the shape of a conventional wind turbine blade and comprises a root region 3000 closest to the hub, a profiled or an airfoil region 3400 furthest away from the hub and a transition region 3200 between the root region 3000 and the airfoil region 3400. The blade 1000 comprises a leading edge 1800 facing the direction of rotation of the blade 1000, when the blade is mounted on the hub, and a trailing edge 2000 facing the opposite direction of the leading edge 1800.

The airfoil region 3400 (also called the profiled region) has an ideal or almost ideal blade shape with respect to generating lift, whereas the root region 3000 due to structural considerations has a substantially circular or elliptical cross-section, which for instance makes it easier and safer to mount the blade 1000 to the hub. The diameter (or the chord) of the root region 3000 may be constant along the entire root area 3000. The transition region 3200 has a transitional profile gradually changing from the circular or elliptical shape of the root region 3000 to the airfoil profile of the airfoil region 3400. The chord length of the transition region 3200 typically increases with increasing distance r from the hub. The airfoil region 3400 has an airfoil profile with a chord extending between the leading edge 1800 and the trailing edge 2000 of the blade 1000. The width of the chord decreases with increasing distance r from the hub.

A shoulder 4000 of the blade 1000 is defined as the position, where the blade 1000 has its largest chord length. The shoulder 4000 is typically provided at the boundary between the transition region 3200 and the airfoil region 3400.

It should be noted that the chords of different sections of the blade normally do not lie in a common plane, since the blade may be twisted and/or curved (i.e. pre-bent), thus providing the chord plane with a correspondingly twisted and/or curved course, this being most often the case in order to compensate for the local velocity of the blade being dependent on the radius from the hub.

FIG. 2B is a schematic diagram illustrating a cross sectional view of an exemplary wind turbine blade 1000, e.g. a cross sectional view of the airfoil region of the wind turbine blade 1000. The wind turbine blade 1000 comprises a leading edge 1800, a trailing edge 2000, a pressure side 2400, and a suction side 2600. The wind turbine blade 1000 comprises spar caps 10 including a first spar cap 10*a*, and a second spar cap 10*b*. The wind turbine blade 1000 comprises a chord line 3800 between the leading edge 1800 and the trailing edge 2000. The wind turbine blade 1000 comprises shear webs 4200, such as a leading edge shear web and a trailing edge shear web. The shear webs 4200 could alternatively be a spar box with spar sides, such as a trailing edge spar side and a leading edge spar side. The spar caps 10, 10a, 10b may predominantly comprise carbon fibres, but may also or alternatively comprise glass fibres. The spar caps 10, 10a, 10b may comprise other fibres. The remainder of the shell parts 2400, 2600 may predominantly or entirely comprise glass fibres.

FIG. 3 schematically shows an embodiment of a spar cap 10 for a wind turbine blade according to the present disclosure. The spar cap illustrated in FIG. 3 may form part of a spar cap arranged in a wind turbine blade 1000, such as the spar caps 10, 10a, 10b of the wind turbine blade 1000 as illustrated in FIG. 2.

FIG. 3A is a schematic diagram showing a three-dimensional view of the spar cap 10, FIG. 3B illustrates a cross-sectional view along the width of the spar cap 10 and FIG. 3C shows an exploded view of the spar cap of FIG. 3B.

The spar cap in FIG. 3 comprises a first spar cap layer 20a, a second spar cap layer 20b and a first interlayer 30 arranged between the first spar cap layer 20a and the second spar cap layer 20b.

The first and second spar cap layers 20a, 20b in FIG. 3 consist of a first and second primary pre-cured fibre-reinforced element 21a, 22a, respectively.

The first primary pre-cured fibre reinforced element 21a and the second primary pre-cured fibre reinforced element 22a, i.e. the first and second spar cap layer 20a, 20b, and the first interlayer, each have a length, a width and a thickness. The width and length of the first interlayer 30 is substantially the same as the width and length, respectively, of the first and/or second primary pre-cured fibre reinforced elements 21a, 22a i.e. the first and second spar cap layers 20a, 20b. However, in some embodiments, the first and second primary pre-cured fibre-reinforced elements 21a, 22a are not necessarily the same size and the width and the length of the first interlayer 30 may be only substantially the same as the smallest of the first and second spar cap layers 20a, 20b or even smaller than the smallest spar cap layer.

The first spar cap layer 20a, the second spar cap layer 20b and the first interlayer 30 each have a first surface area 20aa, 20ba, 30a and an opposite second surface area 20ab, 20bb, 30b. The first surface area 20aa of the first spar cap layer 20a is defined by the width and length of the first spar cap layer 20a, the first surface area 20ba of the second spar cap layer 20b is defined by the width and length of the second spar cap layer 20b and the first surface area 30a of the first interlayer 30 is defined by the width and length of the first interlayer 30.

The first surface area 30a of the first interlayer 30 is in contact with the second surface area 20ab of the first spar cap layer 20a and the second surface area 30b of the first interlayer 30 is in contact with the first surface area 20ba of the second spar cap layer 20b.

In the embodiment illustrated in FIG. 3, the length and width of the first and second spar cap layers 20a, 20b equals the length and width of the spar cap 10, whereas the thickness of the spar cap is the aggregated thickness of the first interlayer 30 and the first and second spar cap layers 20a 20b. In the event that the first and second spar cap layers 20a, 20b each consists of a single primary pre-cured fibre reinforced element 21b, 21b, the length and width of the first and second primary pre-cured fibre reinforced element 21a, 21b would equal the length and width of the spar cap 10, whereas the thickness of the spar cap would be the aggregated thickness of the first interlayer 30 and the first and second primary pre-cured fibre reinforced element 21a, 21b.

In the embodiment of FIG. 3, the first interlayer comprises a first primary interlayer area 31a comprising a first interlayer sheet 33 comprising a first plurality of fibres. Furthermore, the first interlayer 30 comprises a second primary interlayer area 32a comprising a second interlayer sheet 34 comprising a second plurality of fibres. The first primary interlayer area 31a extends along the whole width and a first part of the length of the first interlayer 30, whereas the second primary interlayer area 32a extends along the whole width and a second part of the length of the first interlayer 30. The first plurality of fibres is of a different type than the second plurality of fibres. Thus, the spar cap 10 comprises a first interlayer 30, wherein the fibre material varies along the length of the spar cap 10. Alternatively or additionally, fibre ratio and/or density of the first interlayer sheet 33 may be different than fibre ratio and/or density of the second interlayer sheet 34.

Since the risk of different failure modes differs along the span of a wind turbine blade, it is advantageous to vary the characteristics of a spar cap placed therein, along its length, to optimize the spar cap, and thereby the wind turbine blade.

In a preferred embodiment, the first interlayer sheet is a polyester veil and the second interlayer sheet is a bidirectional glass-fibre fabric. The use of polyester veil in the interlayer promotes resin infusion, provides wetting of the area between spar cap layers and reduces the amount of defects. Furthermore, polyester veils reduce the fractures toughness. Bidirectional glass fibre fabrics are particularly suitable for part of the spar cap, providing structural bridging and strength in the gap between neighbouring fibre-reinforced elements, but have a lower fracture toughness than other materials. The present inventors have found that the combination of polyester veils and bidirectional glass fibre fabrics in an interlayer facilitates to optimize the mechanical properties of the final spar cap 10.

Preferably, the plurality of pre-cured fibre-reinforced elements 21a, 22a and the first interlayer 30 are embedded in a first cured resin. This may be done in an offline pre-form mould or directly in a blade mould. Preferably, each of the plurality of pre-cured fibre reinforced elements 21a, 22a are pultruded carbon planks, such as pultruded carbon fibre reinforced plastic planks.

Although not specifically illustrated, interlayers, such as the first interlayer 30, may also be provided between adjacent elements in the width direction, to facilitate resin flow between elements also in this direction.

FIG. 4 shows another exemplary embodiment of a spar cap 10 for a wind turbine blade according to the present disclosure. The spar cap illustrated in FIG. 4 may form part of a spar cap arranged in a wind turbine blade 1000, such as the spar caps 10 of the wind turbine blade 1000 as illustrated in FIG. 2. FIG. 4A is a schematic diagram showing a three-dimensional view of the spar cap 10, whereas FIG. 4B illustrates a cross-sectional view along the width of the spar cap 10 of FIG. 4A.

The spar cap in FIG. 4 comprises a first spar cap layer 20a, a second spar cap layer 20b and a third spar cap layer 20c. The spar cap 10 comprises a first interlayer 30 arranged between the first spar cap layer 20a and the second spar cap layer 20b and a second interlayer 40 arranged between the second spar cap layer 20b and the third spar cap layer 20c.

The first, second and third spar cap layers 20a, 20b, 20c each comprise three pre-cured fibre-reinforced elements 21, 22, 23, including a primary pre-cured fibre-reinforced element 21a, 22a, 23a, a secondary pre-cured fibre-reinforced element 21b, 22b, 23b and a tertiary pre-cured fibre-reinforced element 21c, 22c, 23c.

Each pre-cured fibre-reinforced element have a length, a width and a thickness, wherein the length is longer than the width, and the width is larger than the thickness.

In each layer, the secondary pre-cured fibre-reinforced element 21b, 22b, 23b is arranged between the primary and tertiary pre-cured fibre-reinforced element 21a, 22a, 23a, 21c, 22c, 23c, such that a first side of the primary pre-cured fibre-reinforced element 21a, 22a, 23a, defined by its thickness and length, is arranged adjacent to a second side of the secondary pre-cured fibre-reinforced element 21b, 22b, 23b, defined by its thickness and length, and such that a first side of the secondary pre-cured fibre-reinforced element 21b, 22b, 23b, defined by its thickness and length, is arranged adjacent to a second side of the tertiary pre-cured fibre-reinforced element 21c, 22c, 23c, defined by its thickness and length.

The first and second interlayer 30, 40 and the first, second and third spar cap layers 20a, 20b, 20c each have a length, a width and a thickness. In the embodiment illustrated in FIG. 4, the width and length of the first and second interlayers 30, 40 are substantially the same as the width and length, respectively, of the first, second and third spar cap layer 20a, 20b, 20c.

The first, second and third spar cap layers 20a, 20b, 20c and the first and second interlayers 30, 40 further each have a first surface area 20aa, 20ba, 20ca, 30a, 40a and an opposite second surface area 20ab, 20bb, 20cb, 30b, 40b. The first surface area 20aa of the first spar cap layer 20a is defined by the width and length of the first spar cap layer 20a, the first surface area 20ba of the second spar cap layer 20b is defined by the width and length of the second spar cap layer 20b and the first surface area 20ca of the third spar cap layer 20c is defined by the width and length of the third spar cap layer 20c. The first surface area 30a of the first interlayer 30 is defined by the width and length of the first interlayer 30 and the first surface area 40a of the second interlayer 40 is defined by the width and length of the second interlayer 40.

The first surface area 30a of the first interlayer 30 is in contact with the second surface area 20ab of the first spar cap layer 20a and the second surface area 30b of the first interlayer 30 is in contact with the first surface area 20ba of the second spar cap layer 20b. The first surface area 40a of the second interlayer 40 is in contact with the second surface area 20bb of the second spar cap layer 20b and the second surface area 40b of the second interlayer 40 is in contact with the first surface area 20ca of the third spar cap layer 20c.

In the embodiment illustrated in FIG. 4, the length and width of the first, second and third spar cap layers 20a, 20b, 20c equals the length and width of the spar cap 10, whereas the thickness of the spar cap is the aggregated thickness of the first interlayer 30, the second interlayer 40 and the first, second and third spar cap layers 20a, 20b, 20c. In the embodiment illustrated in FIG. 4, the length of the pre-cured fibre reinforced elements 21a,21b, 21c, 22a,22b, 22c, 22a, 22b, 22c equals the length of the spar cap 10. The width of the spar cap 10 is the aggregate width of the three fibre-reinforced elements arranged adjacent to each other, and the thickness of the spar cap is the aggregated thickness of the first and second interlayer 30, 40 as well as the first, second and third spar cap layers 20a, 20b, 20c.

The first and/or second interlayers 30, 40 each comprises a first primary interlayer area 31a and a first secondary interlayer area 31b. The first primary interlayer area 31a and the first secondary interlayer area 31b comprise a plurality of first interlayer sheets 33. The first interlayer sheets 33 comprises a first plurality of fibres. Furthermore, the first and/or second interlayers 30, 40 each comprises a second primary interlayer area 32a comprising a second interlayer sheet 34 comprising a second plurality of fibres. In some embodiments, the second primary interlayer area 32a may comprise a plurality of second interlayer sheets 34. The first primary interlayer area 31a extends along the whole width and a first part of the length of the interlayer 30,40. The second primary interlayer area 32a extends along the whole width and a second part of the length of the interlayer 30,40. The first secondary interlayer area 31b extends along the whole width and a third part of the length of the interlayer 30,40. Thus, the second primary interlayer area 32a may be located between the first primary interlayer area 31a and the first secondary interlayer area 31b. The first plurality of fibres, i.e. the fibres of the first interlayer sheets 33 of the first primary interlayer area 31a and the first secondary interlayer area 31b, may be of a different type than the second plurality of fibres, i.e. the fibres of the second interlayer sheet(s) 34 of the second primary interlayer area 32a. Thus, the spar cap comprises a first and/or second interlayer 30, 40, wherein the fibre material varies along the length direction, such that the outer edges of the spar cap 10 comprise one type of fibre material in the interlayers, and the middle part of the spar cap comprises another type.

The first interlayer 30 and the second interlayer 40 may be identical, as illustrated in FIG. 4. However, alternatively, they may be different, and the above description may apply to either of the first interlayer 30 or the second interlayer 40.

Preferably, the plurality of pre-cured fibre-reinforced elements and the plurality of interlayers are embedded in a first cured resin to form the finished spar cap. This may be done in an offline pre-form mould or directly in a blade mould.

Preferably, each of the plurality of pre-cured fibre reinforced elements are pultruded carbon planks, such as pultruded carbon fibre reinforced plastic planks.

Although not specifically illustrated, interlayers may also be provided between adjacent elements in the width direction, to facilitate resin flow between elements also in this direction.

FIG. 5 schematically illustrates five different embodiments of interlayers for a spar cap, seen from a top view, according to the present disclosure. The number of interlayers in a spar cap according to the present disclosure may be similar or identical. However, the different interlayers in a spar cap may also differ, such that the fibre type in the thickness direction of a spar cap varies. Any of the interlayers 30 as illustrated in FIG. 5 may substitute the interlayers 30, 40 of the embodiments of FIGS. 3, 4, 6 and/or 7.

FIG. 5A shows a first embodiment of an interlayer 30' according to the present disclosure, configured to be arranged between a first spar cap layer and a second spar cap layer as described in FIGS. 3 and 4.

The interlayer 30' comprises a first primary interlayer area 31a and a first secondary interlayer area 31b comprising first interlayer sheets 33. The first interlayer sheets comprises a first plurality of fibres. The interlayer 30' comprises a second primary interlayer area 32a comprising a number of second interlayer sheets 34. The second interlayer sheets 34 comprises a second plurality of fibres, of a different type than the first plurality of fibres. The first primary interlayer area 31a extends along the whole width and a first part of the length of the interlayer 30'. The second primary interlayer area 32a extends along the whole width and a second part of the length of the interlayer 30'. The first secondary interlayer area 31*b* extends along the whole width and a third part of the length of the interlayer 30'. Thus, the second primary interlayer area 32*a* is located between the first primary interlayer area 31*a* and the first secondary interlayer area 31*b*. The interlayer 30' is configured to be arranged in a spar cap, such that the fibre material varies along the length direction, such that the outer edges of the spar cap comprise one type of fibre material in the interlayers, and the middle part of the spar cap comprises another type of fibres.

FIG. 5B shows a second embodiment of an interlayer 30" according to the present disclosure, configured to be arranged between a first spar cap layer and a second spar cap layer as described in FIGS. 3 and 4.

The interlayer 30" comprises a plurality of first interlayer areas, such as four first interlayer areas, including a first primary interlayer area 31*a*, a first secondary interlayer area 31*b*, a first tertiary interlayer area 31*c* and a first quaternary interlayer area 31*d*. The first interlayer areas comprise a plurality of first interlayer sheets 33, such as one for each of the first interlayer areas. The first interlayer sheets 33 each comprises a first plurality of fibres. The interlayer 30" comprises a plurality of second interlayer areas, such as three second interlayer areas, including a second primary interlayer area 32*a*, a second secondary interlayer area 32*b* and a second tertiary interlayer area 32*c*. The second interlayer areas comprise a plurality of second interlayer sheets 34, e.g. one for each of the second interlayer areas. The second interlayer sheets 34 each comprises a second plurality of fibres, different from the first plurality of fibres. The first primary, secondary, tertiary and quaternary interlayer areas 31*a*-31*d* extend along the whole width and a part of the length of the interlayer 30". The second primary, secondary and tertiary interlayer areas 32*a*-32*c* also extends along the whole width and part of the length of the interlayer 30". The first interlayer areas 31*a*-31*d* and the second interlayer areas 32*a*-32*c* are alternating along the length of the interlayer 30".

Thus, the first interlayer is configured to be arranged in a spar cap, such that the fibre material varies along the length direction, such that parts of the spar cap comprise one type of fibre material in the interlayers, and some parts of the spar cap comprises another type.

FIG. 5C shows a third embodiment of an interlayer 30''' according to the present disclosure, configured to be arranged between a first spar cap layer and a second spar cap layer as described in FIGS. 3 and 4.

The interlayer 30''' comprises a first primary interlayer area 31*a* and a first secondary interlayer area 31*b* comprising a number of first interlayer sheets 33. The first interlayer sheets 33 comprises a first plurality of fibres. The interlayer 30''' comprises a second primary interlayer area 32*a* comprising a number of second interlayer sheets 34. The second interlayer sheets comprises a second plurality of fibres, of a different type than the first plurality of fibres. The first primary interlayer area 31*a* extends along the whole length and a first part of the width of the interlayer 30'. The second primary interlayer area 32*a* extends along the whole length and a second part of the width of the interlayer 30'''. The first secondary interlayer area 31*b* extends along the whole length and a third part of the width of the interlayer 30'''. Thus, the second primary interlayer area 32*a* is located between the first primary interlayer area 31*a* and the first secondary interlayer area 31*b*. The first interlayer is configured to be arranged in a spar cap, such that the fibre material varies along the width, such that the outer edges of the spar cap comprise one type of fibre material in the interlayers, and the middle part of the spar cap comprises another type of fibres.

FIG. 5D shows a fourth embodiment of an interlayer 30"" according to the present disclosure, configured to be arranged between a first spar cap layer and a second spar cap layer as described in FIGS. 3 and 4.

The interlayer 30"" comprises a plurality of first interlayer areas, such as four first interlayer areas, including a first primary interlayer area 31*a*, a first secondary interlayer area 31*b*, a first tertiary interlayer area 31*c* and a first quaternary interlayer area 31*d*. The first interlayer areas comprise a plurality of first interlayer sheets 33, e.g. one for each first interlayer area. The first interlayer sheets 33 each comprises a first plurality of fibres. The interlayer 30"" comprises a plurality of second interlayer areas, such as three second interlayer areas, including a second primary interlayer area 32*a*, a second secondary interlayer area 32*b* and a second tertiary interlayer area 32*c*. The second interlayer areas 32*a*-32*c* comprises a plurality of second interlayer sheets 34, e.g. one for each second interlayer area 32*a*-32*c*. The second interlayer sheets 34 each comprises a second plurality of fibres, different from the first plurality of fibres. The first primary, secondary, tertiary and quaternary interlayer areas 31*a*-31*d* extend along the whole length and a part of the width of the interlayer 30'. The second primary, secondary and tertiary interlayer area 32*a*-32*c* also extends along the whole length and part of the width of the first interlayer. The first interlayer areas 31*a*-31*d* and the second interlayer areas 32*a*-32*c* are alternating along the width of the interlayer 30"". The first interlayer is configured to be arranged in a spar cap, such that the fibre material varies along the width direction, such that parts of the spar cap comprise one type of fibre material in the interlayers, and some parts of the spar cap comprises another type.

FIG. 5E shows a fifth embodiment of an interlayer 30 according to the present disclosure, configured to be arranged between a first spar cap layer and a second spar cap layer as described in FIGS. 3 and 4.

The interlayer 30 comprises a first primary interlayer area 31*a* comprising a number of interlayer sheets 33 comprising a first plurality of fibres. The interlayer 30 comprises a second primary interlayer area 32*a* comprising a number of interlayer sheets 34 comprising a second plurality of fibres, different from the first plurality of fibres. The first primary interlayer area 31*a* extends along the whole length and the whole width of the interlayer 30, in a way such that the second primary interlayer area 32*a* is surrounded by the first primary interlayer area 31*a*. The second primary interlayer area 32*a* extend along part of the length and a part of the width of the interlayer 30. Thereby, the first primary interlayer area 31*a* forms part of the perimeter of the interlayer 30. The interlayer 30 is configured to be arranged in a spar cap, such that the fibre material varies along the width direction and the length direction, such that inner parts of the spar cap comprise one type of fibre material in the interlayers, and outer parts of the spar cap comprises another type.

FIG. 6 schematically illustrates a front view of three different embodiments of a spar cap according to the present disclosure. By front view is meant, showing the thickness and width of the spar cap. The spar cap in FIG. 6 comprises three spar cap layers 20*a*, 20*b*, 20*c*, e.g. as described in relation to FIG. 3. Each of the spar cap layers has four pre-cured fibre reinforced elements arranged adjacent to each other. Furthermore, the spar cap in FIG. 6 comprises two identical interlayers i.e. a first and a second interlayer 30, 40.

FIG. 6A is a front view of a spar cap 10 comprising a first and second interlayer 30, 40 with a similar construction as the interlayer described in relation to FIG. 5C. FIG. 6B is a front view of a spar cap 10 comprising a first and second interlayer 30, 40 with a similar construction as the interlayer described in relation to FIG. 5D. FIG. 6C is a front view of a spar cap comprising a first and second interlayer 30, 40 with a similar construction as the interlayer described in relation to FIG. 5E.

FIG. 7 schematically illustrates a side view of three different embodiments of a spar cap 10 according to the present disclosure. By side view is meant, showing the thickness and length of the spar cap 10. The spar caps 10 in FIG. 7 comprises three spar cap layers 20a, 20b, 20c, e.g. as described in relation to FIG. 3. Furthermore, the spar cap in FIG. 7 comprises two identical interlayers i.e. a first and a second interlayer 30, 40.

FIG. 7A is a side view of a spar cap 10 comprising a first and second interlayer 30, 40 with a similar construction as the interlayer 30' described in relation to FIG. 5A. FIG. 7B is a side view of a spar cap 10 comprising a first and second interlayer 30, 40 with a similar construction as the interlayer 30" described in relation to FIG. 5B. FIG. 7C is a side view of a spar cap 10 comprising a first and second interlayer 30, 40 with a similar construction as the interlayer 30 described in relation to FIG. 5E.

FIG. 8 schematically illustrates an exemplary interlayer 30', such as the interlayer 30' as described with respect to FIG. 5A, showing that the number of first interlayer sheets 33 and/or the number of second interlayer sheets 34 may differ, even though the final interlayer 30' is the same.

One interlayer sheet may be sufficient for an interlayer to be arranged between two spar cap layers. However, several interlayer sheets may also be used between two spar cap layers, together forming an interlayer. According to the present disclosure at least two interlayer sheets are preferably used, at least one first interlayer sheet comprising a first plurality of fibres and at least one second interlayer sheet comprising a second plurality of fibres, different from the first plurality of fibres. However, a single interlayer sheet comprising different fibres in different areas, could be used in the alternative. In practice, it may be easier to use two types of sheets, one comprising the first plurality of fibres and the other comprising the second plurality of fibres.

FIG. 8A illustrates the interlayer 30' as described in relation to FIG. 5A, whereas FIG. 8B-8D illustrates how the number of first and second interlayer sheets 33, 34 in the interlayer according to FIG. 8A. may be varied, even though the final interlayers are similar.

FIG. 8B illustrates the simplest embodiment, where one first interlayer sheet 33 is used for the first primary interlayer area 31a and another first interlayer sheet 33 is used for the first secondary interlayer area 31b. One second interlayer sheet 34 is used for the second primary interlayer area 32a.

FIG. 8C illustrates another embodiment, where two first interlayer sheets 33 are used for the first primary interlayer area 31a and two other first interlayer sheets 33 are used for the first secondary interlayer area 31b. Two second interlayer sheets 34 are used for the second primary interlayer area 32a.

FIG. 8D illustrates a further embodiment, where one first interlayer sheet 33 is used for the first primary interlayer area 31a and another first interlayer sheet 33 is used for the first secondary interlayer area 31b. Furthermore, five second interlayer sheets 34 are used for the second primary interlayer area 32a.

Although not illustrated specifically, it can be realised that the other exemplary interlayers as illustrated in the previous figures, e.g. FIGS. 5B-5D may be assembled by a plurality of interlayer sheets, i.e. the first interlayer areas 31a-31d may comprise one or more, such as a plurality, of first interlayer sheets 33, and/or the second interlayer areas 32a-32c may comprise one or more, such as a plurality, of second interlayer sheets 34.

FIGS. 9A and 9B illustrates two alternative embodiments of a first interlayer 30 as illustrated in FIG. 7A. In FIG. 7A, the first number of interlayer sheets 33 and the second number of interlayer sheets 34 are arranged adjacent to each other, such that adjacent edges of the interlayer sheets 33, 34 are contacted with each other. However, in FIGS. 9A and 9B, the first number of interlayer sheets 33 and the second number of interlayer sheets 34 overlap each other in areas where they meet. Thus, the interlayer in FIG. 9 comprise different fibre layers both along the length-direction and in the thickness direction.

In some embodiments, as illustrated in FIG. 10, the first interlayer 30 comprises a plurality of carbon fibres 50 forming part of the first surface area of the first interlayer 30a as well as second surface area of the first interlayer 30b. Thus, the plurality of carbon fibres 50 extend through the first interlayer 30. Preferably, the carbon fibres 23 extend through all interlayer sheets present in the interlayer sheet 20. Thus, for the embodiments illustrated in FIG. 3-8, the carbon fibres 50 may extend through a single interlayer sheet. However, in the embodiment illustrated in FIG. 9, the carbon fibres 50 may extend through the overlapping interlayer sheets i.e. through two interlayer sheets arranged on top of each other. In this way, electrical conductivity through the interlayer may be obtained, which facilitates electron flow between elements, such as pultruded elements, when sandwiched therebetween.

LIST OF REFERENCE NUMERALS 10 spar cap
10a first spar cap
10b second spar cap
20 spar cap layers
20a first spar cap layer
20aa first surface area of first spar cap layer
20ab second surface area of first spar cap layer
20b second spar cap layer
20ba first surface area of second spar cap layer
20bb second surface area of second spar cap layer
20c third spar cap layer
21,22,23 pre-cured fibre-reinforced elements
21a first primary pre-cured fibre-reinforced element
21b first secondary pre-cured fibre-reinforced element
21c first tertiary pre-cured fibre-reinforced element
22a second primary pre-cured fibre-reinforced element
22b second secondary pre-cured fibre-reinforced element
22c second tertiary pre-cured fibre-reinforced element
23a third primary pre-cured fibre-reinforced element
23b third secondary pre-cured fibre-reinforced element
23c third tertiary pre-cured fibre-reinforced element
30 first interlayer
30a first surface area of first interlayer
30b second surface area of first interlayer
31 first interlayer area
31a first primary interlayer area
31b first secondary interlayer area
32 second interlayer area
32a second primary interlayer area 32b second secondary interlayer area
33 first interlayer sheet
34 second interlayer sheet
35 first plurality of fibres
36 second plurality of fibres
40 second interlayer
50 carbon fibres extending through the first interlayer
L length
W width
T thickness
200 wind turbine
400 tower
600 nacelle
800 hub
1000 blade
1400 blade tip
1600 blade root
1800 leading edge
2000 trailing edge
2400 pressure side
2600 suction side
3000 root region
3200 transition region
3400 airfoil region
3800 chord line
4000 shoulder/position of maximum chord
4200 shear web

The invention claimed is:

1. A spar cap (10) for a wind turbine blade (1000) comprising:
a plurality of spar cap layers (20) each including:
a first spar cap layer (20a) comprising a first number of pre-cured fibre-reinforced elements (21), including a first primary pre-cured fibre-reinforced element (21a); and
a second spar cap layer (20b) comprising a second number of pre-cured fibre-reinforced elements (22), including a second primary pre-cured fibre-reinforced element (22a),
wherein each of the first and second number of pre-cured fibre reinforced elements (21, 22) has a length (L), a width (W) and a thickness (T),
wherein a first interlayer (30) is arranged between the first spar cap layer (20a) and the second spar cap layer (20b), the first interlayer (30) comprising:
a number of first interlayer areas (31), including a first primary interlayer area (31a), comprising a first number of interlayer sheets (33) comprising a first plurality of fibres (35); and
a number of second interlayer areas (32), including a second primary interlayer area (32a), comprising a second number of interlayer sheets (34) comprising a second plurality of fibres (36);
wherein the first number of interlayer sheets (33) is of a different characteristic than the second number of interlayer sheets (34), and
wherein the first spar cap layer (20a) further comprises a first secondary pre-cured fibre-reinforced element (21b) arranged adjacent to the first primary pre-cured fibre reinforced element (21a), such that a first side of the first primary pre-cured fibre-reinforced element (21a) is defined by the thickness and length of the first primary pre-cured fibre-reinforced element (21a), and is further positioned adjacent to a second side of the first secondary pre-cured fibre-reinforced element (21b), which is defined by the thickness and length of the first secondary pre-cured fibre-reinforced element (21b).

2. The spar cap according to claim 1, wherein the different characteristic is fibre type and/or fibre density and/or fibre ratio.

3. The spar cap according to claim 1, wherein the first spar cap layer (20a), the second spar cap layer (20b) and the first interlayer (30) each have a length (La, Lb, Lc), a width (Wa, Wb, Wc) and a thickness (Ta, Tb, Tc), wherein the width (Wc) and length (Lc) of the first interlayer are the same as the width (Wa, Wb) and length (La, Lb), respectively, of the first and/or second spar cap layer.

4. The spar cap according to claim 1, wherein the first spar cap layer (20a), the second spar cap layer (20b) and the first interlayer (30) each have a first surface area (20aa, 20ba, 30a) and an opposite second surface area (20ab, 20bb, 30b), wherein the first surface area (20aa, 20ba, 30a) of the first spar cap layer (20a), the second spar cap layer (20b) and the first interlayer (30) is defined by the width and length of the first spar cap layer (20a), the second spar cap layer (20b) or the first interlayer (30), respectively, and wherein the first surface area (30a) of the first interlayer (30) is in contact with the second surface area (20ab) of the first spar cap layer (20a) and the second surface area (30b) of the first interlayer (30) is in contact with the first surface area (20ba) of the second spar cap layer (20b).

5. The spar cap according to claim 1, wherein the first primary interlayer area (31a) extends along a first part of a length of the first interlayer (30) and wherein the second primary interlayer area (32a) extends along a second part of the length of the first interlayer (30).

6. The spar cap according to claim 1, wherein the first primary interlayer area (31a) extends along a first part of a width of the first interlayer (30) and wherein the second primary interlayer area (32a) extends along a second part of the width of the first interlayer (30).

7. The spar cap according to claim 1, wherein the second primary interlayer area (32a) is positioned adjacent to the first primary interlayer area (31a).

8. The spar cap according to claim 1, wherein the first primary interlayer area (31a) forms at least part of a perimeter of the first interlayer (30).

9. The spar cap according to claim 1, wherein the first interlayer (30) comprises a plurality of second interlayer areas (32), including the second primary interlayer area (32a).

10. The spar cap according to claim 9, wherein the number of first interlayer areas (31) and the plurality of second interlayer areas (32) each extends along part of a length of the first interlayer (30), and wherein the number of first interlayer areas (31) and the plurality of second interlayer areas (32) are alternating along the length of the first interlayer (30).

11. The spar cap according to claim 9, wherein the first plurality of interlayer areas (31) and the second plurality of interlayer areas (32) each extends along part of a width of the first interlayer (30), and wherein the first plurality of interlayer areas (31) and the second plurality of interlayer areas (32) are alternating along the width of the first interlayer (30).

12. The spar cap according to claim 1, wherein the first number of interlayer sheets and the second number of interlayer sheets are arranged adjacent to each other such that adjacent edges of the interlayer sheets are contacted with each other or wherein the first number of interlayer sheets and the second number of interlayer sheets overlap each other in areas where the first and second number of interlayer sheets meet.

13. The spar cap according to claim 1, wherein the first plurality of fibres (35) comprises polymeric filaments.

14. The spar cap according to claim 1, wherein the second plurality of fibres (36) comprises glass fibres and/or carbon fibres.

15. The spar cap according to claim 1, wherein the first and/or second number of interlayer sheets (33, 34) are veils comprising randomly oriented fibres.

16. The spar cap according to claim 1, wherein the first and/or second number of interlayer sheets (33, 34) are nets, comprising woven fibres.

17. The spar cap according to claim 1, wherein the first number of interlayer sheets (33) are polyester veils and the second number of interlayer sheets (34) are bidirectional glass-fibre fabrics.

18. The spar cap according to claim 1, wherein each of the first and second number of pre-cured fibre reinforced elements (21, 22) are pultruded carbon fibre reinforced plastic planks.

19. A wind turbine blade comprising the spar cap according to claim 1.

\* \* \* \* \*